US006768417B2

(12) United States Patent
Kuragaki et al.

(10) Patent No.: US 6,768,417 B2
(45) Date of Patent: Jul. 27, 2004

(54) ON-VEHICLE EMERGENCY REPORT APPARATUS, EMERGENCY COMMUNICATION APPARATUS AND EMERGENCY REPORT SYSTEM

(75) Inventors: Satoru Kuragaki, Hitachi (JP); Kazuhiko Sato, Mito (JP); Tokuji Yoshikawa, Hitachi (JP); Takao Kojima, Hitachi (JP); Toshimichi Minowa, Mito (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 10/084,665

(22) Filed: Feb. 28, 2002

(65) Prior Publication Data

US 2003/0117273 A1 Jun. 26, 2003

(30) Foreign Application Priority Data

Dec. 26, 2001 (JP) ...................................... 2001-395267

(51) Int. Cl.[7] .................................................. B60Q 1/00

(52) U.S. Cl. ................. 340/425.5; 340/426; 340/539.1; 340/539.12; 340/539.13; 340/539.18; 340/825.36; 340/825.49

(58) Field of Search .............................. 340/425.5, 426, 340/539, 531, 825.36, 825.49, 539.1, 539.12, 539.13, 539.18; 312/357; 379/37, 45

(56) References Cited

U.S. PATENT DOCUMENTS

| | | | | | |
|---|---|---|---|---|---|
| 5,933,080 | A | * | 8/1999 | Nojima | 340/539.1 |
| 6,262,655 | B1 | * | 7/2001 | Yoshioka et al. | 340/425.5 |
| 6,405,132 | B1 | * | 6/2002 | Breed et al. | 701/301 |

FOREIGN PATENT DOCUMENTS

| | | |
|---|---|---|
| JP | 10-162284 | 6/1998 |

* cited by examiner

*Primary Examiner*—Daryl Pope
(74) *Attorney, Agent, or Firm*—McDermott, Will & Emery

(57) ABSTRACT

An on-vehicle emergency report apparatus, an emergency communication apparatus and an emergency report system are disclosed. The emergency report apparatus includes an emergency situation prediction unit for predicting the possibility of a vehicle involved encountering an emergency situation, a report control unit and a communication unit. The communication is established based upon the determination of the emergency situation prediction unit, which predicts the possibility of the vehicle encountering an emergency situation a predetermined time later, based on at least one of the feature quantities including the distance between the vehicle involved and the vehicle running immediately ahead, the relative speed, the relative acceleration, the speed of the vehicle involved, the brake pedal stroke, the steering wheel angle and the expression of the driver.

10 Claims, 14 Drawing Sheets

ON-VEHICLE EMERGENCY REPORT APPARATUS, EMERGENCY COMMUNICATION APPARATUS AND EMERGENCY REPORT SYSTEM

BACKGROUND OF THE INVENTION

The present invention relates to an on-vehicle emergency report apparatus, an emergency communication apparatus and an emergency report system, or in particular to an on-vehicle emergency report apparatus, an emergency communication apparatus and an emergency report system for reporting an emergency at the time of occurrence of an accident such as a collision of vehicles including automobiles.

In the prior art, various apparatuses are provided for securing the running safety of vehicles. No matter how the running safety is improved by the various apparatuses, however, it is difficult to reduce accidents to zero. In the case of an emergency including an accident, therefore, an emergency report system for reporting the emergency to a predetermined organ is effective.

An example of an emergency report system is disclosed in JP-A-10-162284. The emergency report system disclosed in this publication comprises a vehicle station for detecting the position of a vehicle involved and transmitting information on the position of the vehicle, and a Mayday center (emergency report service station) for performing and monitoring a bidirectional communication with the vehicle station, wherein in the case where an emergency report is required for the vehicle station, the Mayday center transmits an emergency report to a plurality of destinations in the order of priority based on the position where the vehicle station is located.

In order to meet a situation where the communication facility is destroyed and becomes inoperative by a vehicle accident, the emergency report system described above detects the degree of danger on the path on which the vehicle involved is running, based the running conditions of the vehicle and the shape of the road on which it is running, and in the case where the degree of danger is higher than a predetermined value, the time from entry to exit from the area of high degree of danger is predicted, reports an emergency situation to the Mayday center in advance, and in the case where the communication is not restored upon lapse of a predetermined time, detects the emergency situation.

A vehicle accident is often caused in the presence of another vehicle such as a collision between vehicles, as well as by the running conditions of the vehicle involved or the shape of the road where it is running. To meet such situations, the emergency report system is required to process a multiplicity of communications by reporting a situation to the emergency report service station (Mayday center) and canceling it upon lapse of a predetermined time in the case where the input information is not sufficient for detecting the degree of danger or the degree of danger is low.

For this reason, in many cases, the conventional emergency report system is required to have a large capacity of the communication line and a large processing capacity of the emergency communication apparatus installed in the emergency report service station to process the advance information canceled.

Also, the emergency report service station communicates with the home of a driver based on the data sent from the emergency report apparatus (vehicle station), and in the case where the emergency situation is an impersonal accident or a malfunction of the vehicle involved, the driver often remains unaffected, and therefore it is sufficient for the driver to report the emergency situation to his/her home.

In the case where the emergency situation is a personal or physical accident resulting in a death or an injury, however, the driver is required to be treated in hospital, and it may be difficult for the driver to wait near the emergency report apparatus (the vehicle involved). Even in the case where the driver could successfully communicate with the his/her home at the place of accident, however, the information on the subsequent destination or the hospital where the driver may be accommodated is often unknown.

The reason why the driver's home address is described as a place of notification at the time of occurrence of an emergency situation is for the driver to seek the help of a person waiting in his/her home in such a situation. What is most important for a person waiting in the driver's home is to be informed, as soon as possible, of not only the very fact of occurrence of a particular emergency situation but also whether the driver is safe or not and where the driver is going to be accommodated. The conventional emergency report system, however, fails to meet these requirements sufficiently.

SUMMARY OF THE INVENTION

The present invention is intended to obviate these problems and the object thereof is to provide an on-vehicle emergency report apparatus, an automotive vehicle having mounted thereon the on-vehicle emergency report apparatus, an emergency report testing apparatus for the on-vehicle emergency report apparatus, an emergency communication apparatus and an emergency report system, wherein the operation of an accurate, reliable emergency report is secured by increasing the appropriateness of an emergency situation prediction, the required capacity of the communication lines of the emergency report system can be reduced, and the processing load of the emergency communication apparatus installed in an emergency report service station can be decreased, and a person concerned can be informed of the place where the vehicle occupant is to be accommodated and whether the occupant is safe or not after the occurrence of an accident.

In order to achieve this object, according to a first aspect of the present invention, there is provided an on-vehicle emergency report apparatus comprising vehicle position detection means for detecting the position of the vehicle involved, emergency situation prediction means for predicting an emergency situation encountered by the vehicle involved and communication means for communicating with an emergency report service station, wherein the emergency situation prediction means predicts whether the vehicle involved encounters an emergency situation a predetermined time later, based on at least one of the feature quantities including the distance from an object to collide with, the relative speed, the relative acceleration, the speed of the vehicle involved, the brake pedal stroke, the steering wheel angle and the facial expression of the driver, and wherein the result of the prediction is transmitted to the emergency report service station by the communication means, together with the vehicle position information detected by the vehicle position detection means.

According to a second aspect of the invention, there is provided an on-vehicle emergency report apparatus, wherein the emergency situation prediction means predicts the position of the vehicle involved and the position of an object to collide with a predetermined time later, based on the distance from an object to collide with, and the running speed, the acceleration and the steering wheel angle of the vehicle involved, and estimates the possibility of collision based on the prediction of the relative positions.

In the on-vehicle emergency report apparatus according to the invention configured as described above, the emergency situation prediction means predicts whether the vehicle involved encounters an emergency situation a predetermined time later, based on at least selected one of the feature quantities including the distance from an object to collide with (the distance from another vehicle running ahead, for example), the relative speed, the relative acceleration, the running speed, the brake pedal stroke, the steering wheel angle and the facial expression of the driver of the vehicle involved. Specifically, the position where the vehicle involved is located and the position of an object to collide with a predetermined time later are predicted based on the distance from the object to collide with, the running speed, the acceleration, the steering wheel angle of the vehicle involved, and the possibility of a collision is estimated based on the relative positions of the vehicle involved and the object to collide with. Therefore, the appropriateness of the prediction of an emergency situation is increased thereby making it possible to report an emergency situation both accurately and reliably.

According to a third aspect of the invention, there is provided an on-vehicle emergency report apparatus comprising an internal power supply in addition to and charged by an on-vehicle power supply, wherein the on-vehicle power supply is used normally, and in the case of failure of power from the on-vehicle power supply, power is supplied from the internal power supply, thereby making it possible to maintain the normal operation regardless of a power failure even in the case where the on-vehicle power supply runs out of order due to an accident.

According to a fourth aspect of the invention, there is provided an on-vehicle emergency report apparatus, wherein the result of the self-diagnosis of the vehicle is transmitted to the emergency report service station by the communication means.

According to a fifth aspect of the invention, there is provided an automotive vehicle having the aforementioned on-vehicle emergency report apparatus mounted thereon.

According to a sixth aspect of the invention, there is provided an emergency situation testing apparatus comprising communication means for communicating with the on-vehicle emergency report apparatus, wherein the result of the self-diagnosis is received from the on-vehicle emergency report apparatus and the acknowledgment of the receipt is transmitted to the on-vehicle emergency report apparatus.

According to a seventh aspect of the invention, there is provided an emergency communication apparatus comprising a notifiee data base for storing the information on the notifiee person concerned and communication means, wherein the communication means includes means for receiving an emergency situation report from the on-vehicle emergency report apparatus, means for requesting a first aid to take an emergency action, means for receiving the information on the prospective destination of the occupant of an emergency-reporting vehicle from the first aid, means for searching the notifiee data base for the notifiee information of the person concerned, associated with the occupant, and means for transmitting the information on the prospective destination of the occupant to the notifiee person concerned.

Upon receipt of an emergency situation report from the on-vehicle emergency report apparatus according to this invention configured as described above, a first aid is requested to take an emergency action, the information on the prospective destination of the occupant of the vehicle involved is received from the first aid, the notifiee data base is searched for the information on the notifiee person concerned, associated with the occupant, and the information on the prospective destination of the occupant is transmitted to the notifiee. Thus, the person concerned can quickly acquire the information on a hospital or other prospective destination where the occupant is to be accommodated.

According to an eighth aspect of the invention, there is provided an emergency communication apparatus, to which a first aid including an emergency hospital constituting the destination and emergency transport means such as an ambulance transmit the information on the prospective destination of the occupant.

According to a ninth aspect of the invention, there is provided an emergency communication apparatus for transmitting the information as to whether the occupant is safe or not, to the notifiee person concerned, in addition to the information on the prospective destination of the occupant.

According to a tenth aspect of the invention, there is provided an emergency communication apparatus, which can receive the information on the position of an emergency-reporting vehicle together with an emergency situation report from the on-vehicle emergency report apparatus and transmit the information on the latest position of the emergency-reporting vehicle to the person concerned, through communication means.

According to an 11th aspect of the invention, there is provided an emergency communication apparatus, wherein in the case where a transferee is set in the telephone of the notifiee person concerned, the telephone number of the transferee is acquired from selected one of the original telephone and the transferee telephone, and the person concerned can be contacted directly through the transferee telephone.

According to a 12th aspect of the invention, there is provided an emergency report system comprising an on-vehicle emergency report apparatus and an emergency communication apparatus installed in an emergency report service station.

As will be understood from the foregoing description, with the on-vehicle emergency report apparatus and the emergency report system according to this invention, the degree of danger is detected based on a greater amount of input information, and therefore the accuracy of the emergency situation prediction means is increased. Thus, the safety of an occupant after an emergency situation can be positively secured. At the same time, both the required capacity of the communication line of the emergency report system and the processing load of the emergency communication apparatus installed in the emergency report service station can be reduced.

Also, with the emergency communication apparatus according to the invention, the person concerned such as a person waiting in the home of the occupant can be informed quickly whether the occupant is safe or not and where he/she is going to be accommodated.

Other objects, features and advantages of the invention will become apparent from the following description of the embodiments of the invention taken in conjunction with the accompanying drawings.

DESCRIPTION OF THE EMBODIMENTS

An embodiment of the invention will be explained below in detail with reference to the accompanying drawings.

Figure 1:
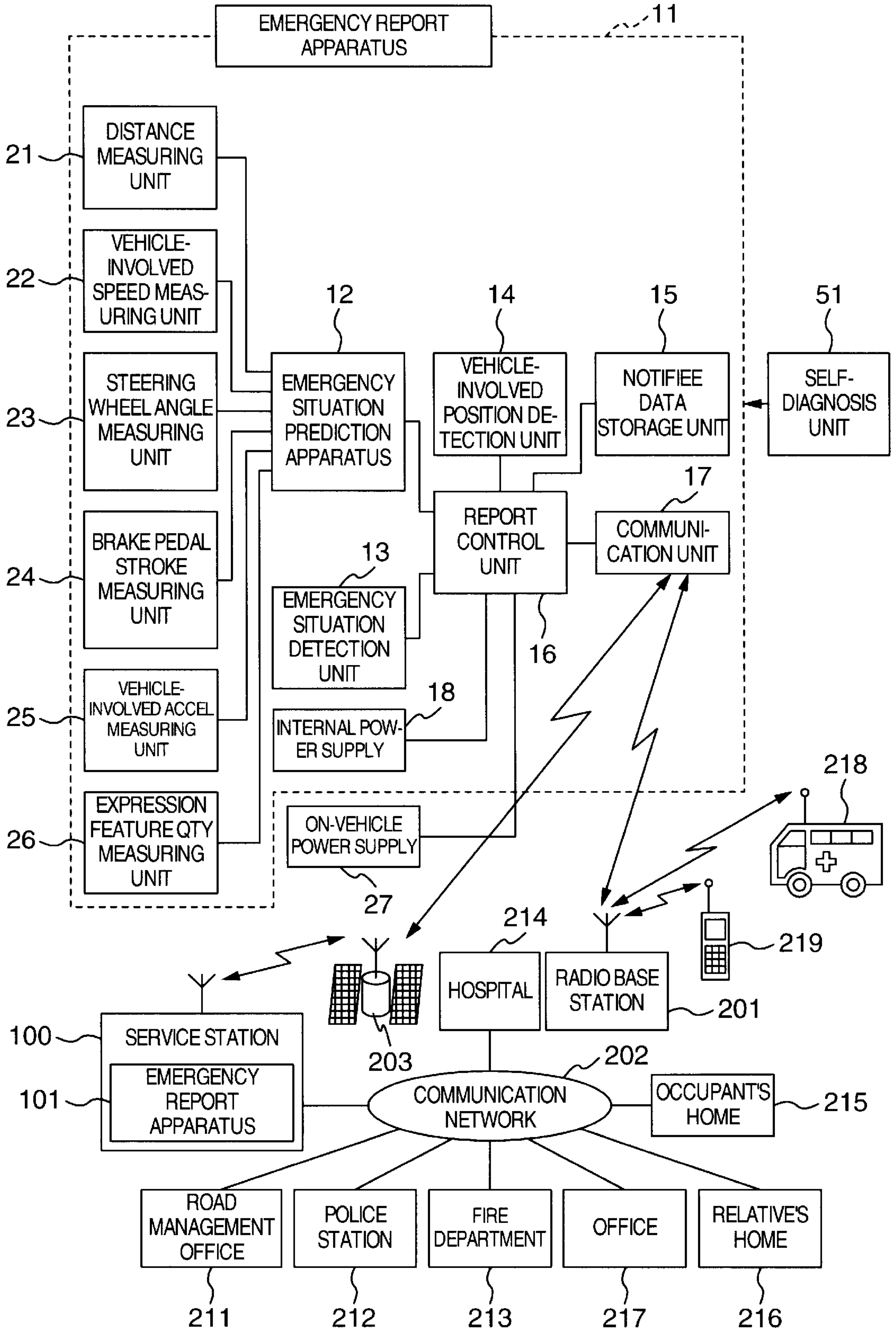
FIG. 1 is a diagram for explaining a general configuration of an emergency report system according to the present invention.

FIG. 1 shows a general configuration of an emergency report system according to an embodiment of the invention. The emergency report system comprises an on-vehicle emergency report apparatus 11 mounted on an automotive vehicle, and an emergency communication apparatus 101 installed in an emergency report service station 100.

The on-vehicle emergency report apparatus 11 includes emergency situation prediction unit 12 configured of a computer with the communication function, emergency situation detection unit 13, vehicle position detection unit 14 with a global positioning system (GPS) or the like, notifiee data storage unit 15, report control unit 16, communication unit 17 and an internal power supply 18.

The on-vehicle emergency report apparatus 11 uses an on-vehicle power supply (battery) 27 as a normal power supply, and includes an internal power supply 18 used as an emergency power supply. These power supplies will be described in detail later with reference to FIG. 2.

The emergency situation prediction unit 12 is supplied with measurements from a distance measuring unit 21 for measuring the spacing to the vehicle front or the like object with which the vehicle involved may collide, vehicle speed measuring unit 22, steering wheel angle measuring unit 23, brake pedal stroke measuring unit 24, vehicle acceleration measuring unit 25 and expression feature amount measuring unit 26. Based on these measurements, the emergency situation prediction unit 12 determines a prediction value, by calculations, associated with an emergency situation such as the vehicle collision.

The emergency situation prediction unit 12 carries out the prediction calculations for determining an emergency situation, based on, for example, the distance from an object with which the vehicle involved may collide as measured by the distance measuring unit 21, the speed of the vehicle involved measured by the vehicle speed measuring unit 22, the acceleration of the vehicle involved as measured by the vehicle acceleration measuring unit 25 and the steering wheel angle measured by the steering wheel angle measuring unit 23. Based on these measurements, the positions, at a predetermined future time, of the vehicle involved and the object with which the vehicle involved may collide are predicted, and the possibility of collision is estimated from the predicted relative positions of the vehicle involved and the object.

The on-vehicle emergency report apparatus 11 is connected to self-diagnosis unit 51 for carrying out the self-diagnosis of the vehicle involved, and supplied with the result of the self-diagnosis of the vehicle involved carried out by the self-diagnosis unit 51. The self-diagnosis unit 51 carries out the self-diagnosis of the vehicle involved when the engine is started or stops, and the result of the self-diagnosis is transmitted by the communication unit 17 to the emergency report service station 100.

The distance measuring unit 21 measures, by radar or the like, the distance from an object with which the vehicle involved may collide, including the distance to an object located ahead of the vehicle involved such as the front-running vehicle or the distance between the vehicle involved and another vehicle running in parallel.

The expression feature amount measuring unit 26 picks up an image of the face of the driver by the CCD camera or the like installed on the vehicle involved, and measures the facial expression feature amount of the driver from the image data using the image processing technique.

Figure 12:
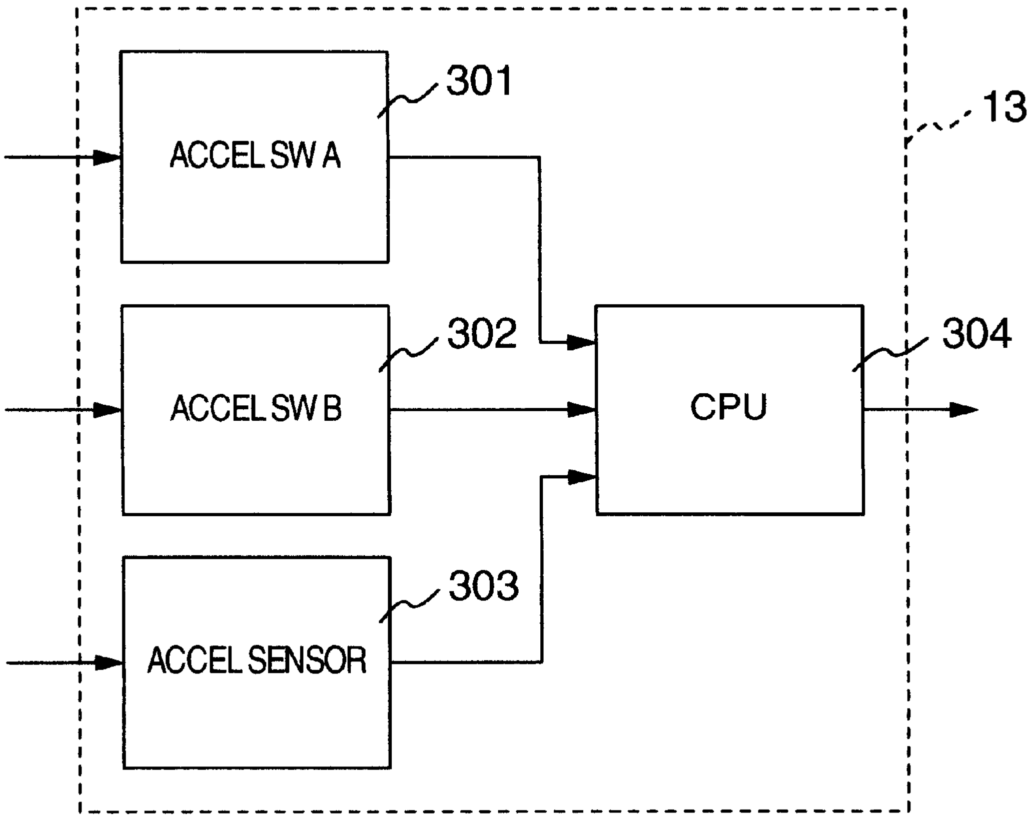
FIG. 12 is a diagram for explaining an emergency situation detection apparatus according to the invention.
Figure 13:
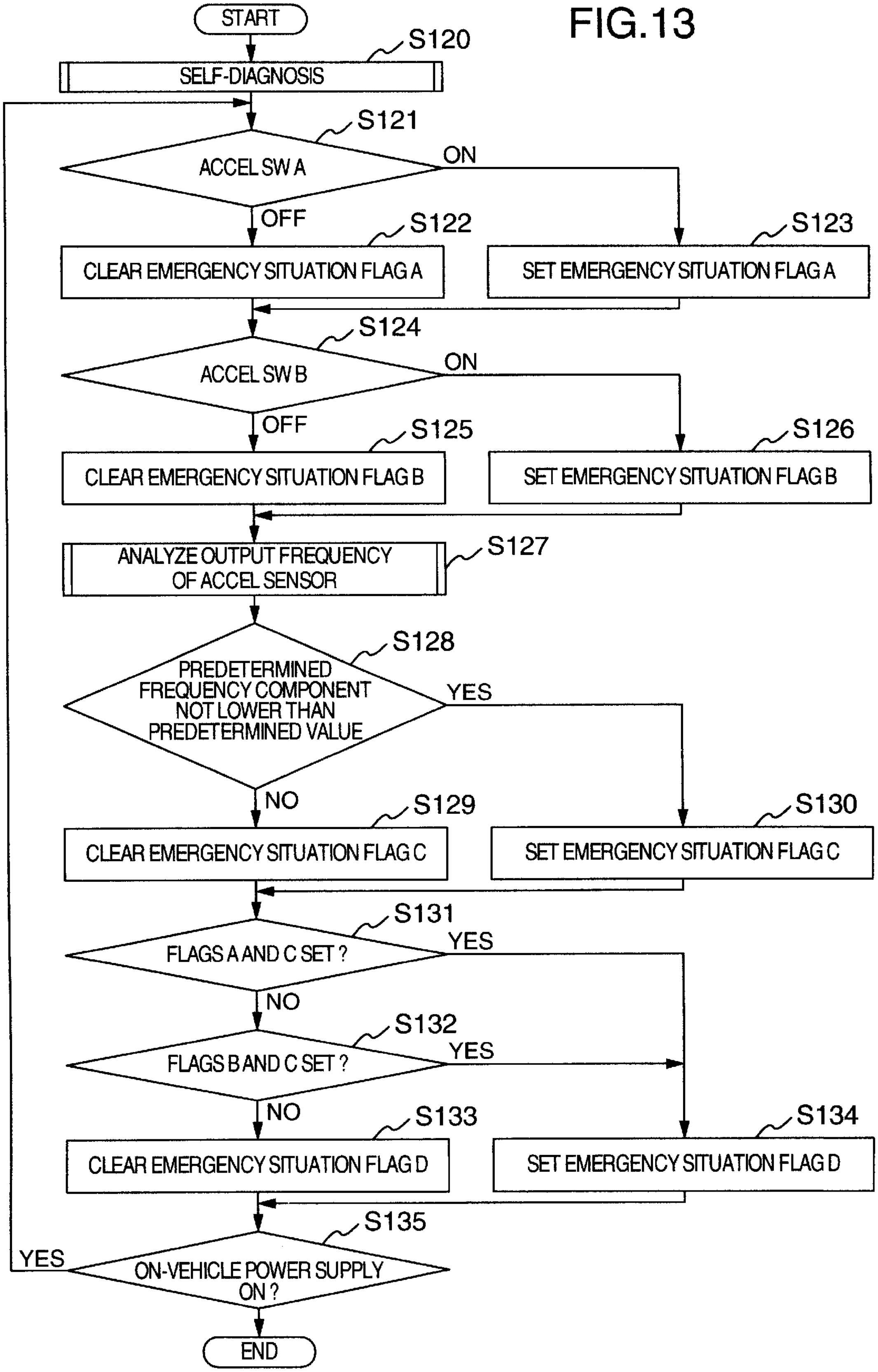
FIG. 13 is a flowchart showing the processing flow for the emergency situation detection apparatus according to the invention.

The emergency situation detection unit 13 includes two acceleration switches, an acceleration sensor and a CPU for detecting an emergency situation based on the vehicle acceleration (for details, refer to FIGS. 12, 13 and the description thereof).

The emergency communication apparatus 101 of the emergency report service station 100 is configured of a computer with the communication function, and is connected for bidirectional communication with the on-vehicle emergency report apparatus 11 by a communication line through a radio station 201 and a communication network 202 such as a public telephone network or by satellite communication through a communication satellite 203.

The emergency communication apparatus 101 is adapted to communicate, through the communication network 202, with communication terminals including a road management office 211, a police station 212, a fire department 213 and a hospital 214. The emergency communication apparatus 101 can be also connected on line with the communication terminals of the persons concerned, associated with the occupant (the driver receiving the service) of the emergency-reporting vehicle. Such communication terminals include the telephone of the home 215 of the driver receiving the service (hereinafter referred to as the home), the telephone of a relative 216 of the driver receiving the service (hereinafter referred to as the relative's home) and the telephone of the office 217 to which the driver receiving the service belongs (hereinafter referred to as the office).

The radio station 201, on the other hand, is adapted to communicate with an ambulance 218 and a portable telephone 219 held by the person concerned, associated with the driver receiving the service.

Figure 2:
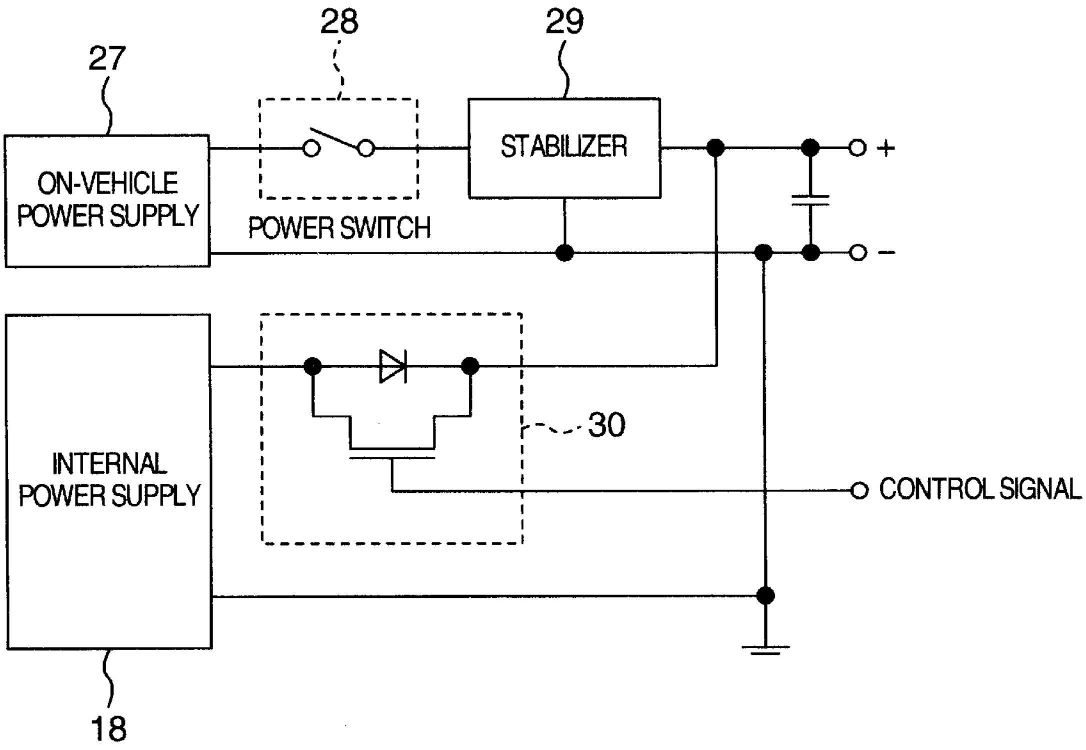
FIG. 2 is a circuit diagram showing a power supply of an on-vehicle emergency report apparatus according to an embodiment of the invention.

Now, the power supplies of the on-vehicle emergency report apparatus 11 will be explained with reference to FIG. 2.

The on-vehicle power supply 27 includes a power switch 28 operatively interlocked with an ignition key switch, whereby the power supplied to the on-vehicle emergency report apparatus 11 can be turned on/off to suppress the variations of the voltage and current with a stabilizer 29.

The internal power supply 18 is a backup power supply configured of a chargeable battery or the like, which can be switched between charge mode and feed mode by a charge/feed circuit 30 operated by a control signal output from the communication control unit 16. In the case where the voltage across the on-vehicle power supply 27 applied to the on-vehicle emergency report apparatus 11 is not lower than a specified value, the internal power supply 18 turns to charge mode and is charged, while in the case where the voltage across the on-vehicle power supply 27 applied to the on-vehicle emergency report apparatus 11 drops to less than a specified value, on the other hand, the feed mode prevails so that power is supplied to the on-vehicle emergency report apparatus 11 by the internal power supply 18 instead of by the on-vehicle power supply 27.

Figure 3:
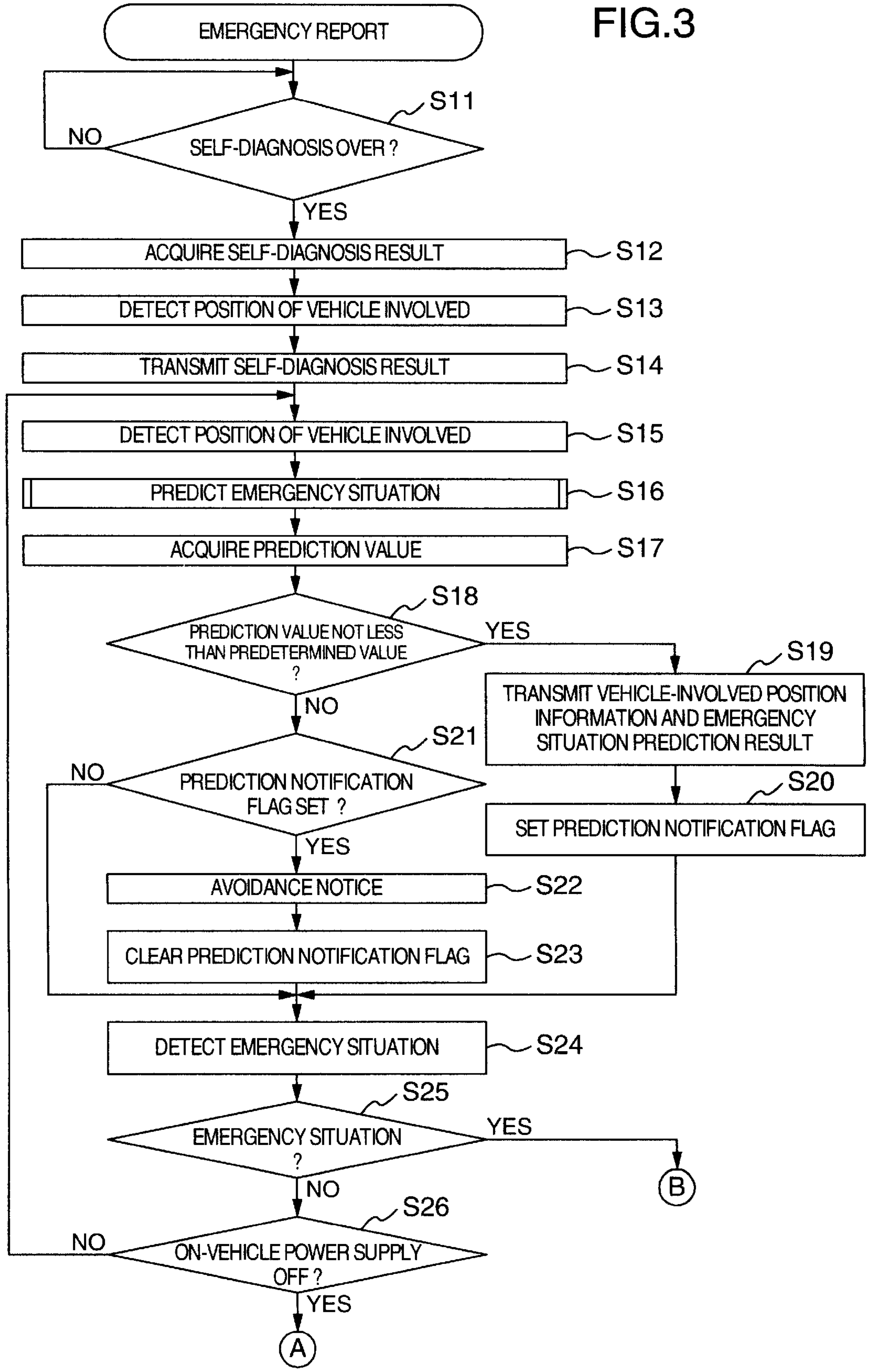
FIG. 3 is a flowchart showing the (first half) processing flow for an on-vehicle emergency report apparatus according to the invention.
Figure 4:
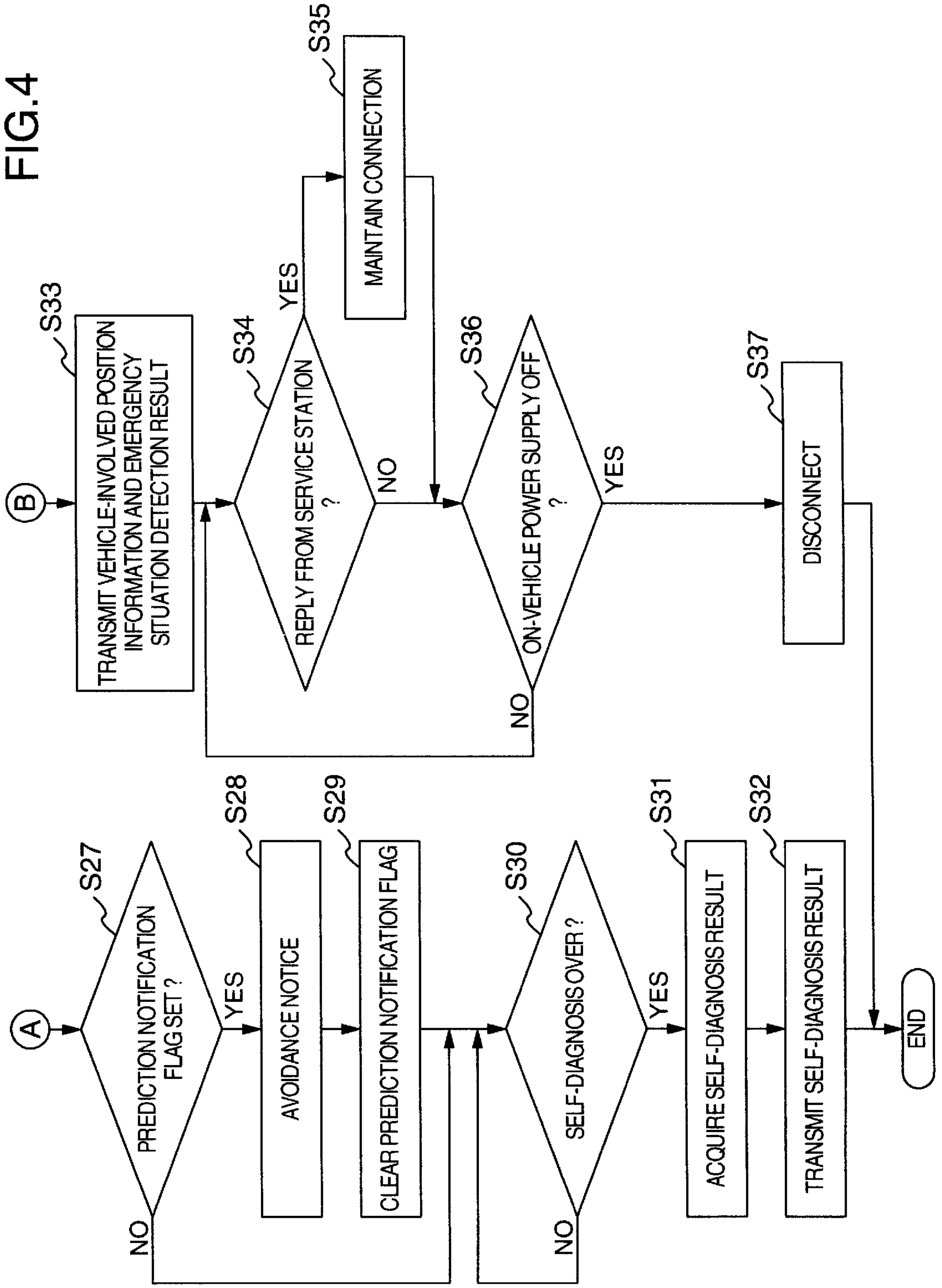
FIG. 4 is a flowchart showing the (second half) processing flow for an on-vehicle emergency report apparatus according to the invention.

Now, the process executed by the on-vehicle emergency report apparatus 11 will be explained with reference to the flowcharts of FIGS. 3 and 4.

This processing flow is started by turning on the power supply for starting the engine. First, the process stands by until the completion of the self-diagnosis of the vehicle at the time of starting the engine (step S11), and the result of the self-diagnosis is acquired (step S12). Then, the position of the vehicle involved is detected (step S13). The result of the self-diagnosis, together with the vehicle position information, is transmitted to the emergency report service station 100 (step S14). The position of the vehicle involved can be detected using the GPS, the on-road communication facilities or the cellular telephone.

The initial processing executed at the time of starting the engine is described above. Once this initial processing for starting the engine is complete, the emergency reporting process is started.

The first step of the emergency reporting process is to detect the position of the vehicle involved (step S15). After detecting the position of the vehicle involved, the emergency situation prediction routine is accessed and executed (step S16). An emergency situation is predicted through the emergency situation prediction routine. Once the emergency situation prediction routine is completed, a prediction value is acquired (step S17), and it is determined whether the prediction value is not less than a predetermined value or not (step S18). In the case where the prediction value is not less than a predetermined value, it indicates that an emergency situation will be encountered a predetermined time later. In this case (affirmative in step S18), the particular prediction result is transmitted, as an advance notice, to the emergency report service station 100 (step S19), together with the information on the position of the vehicle involved. After that, the prediction notice flag is set (step S20), and the process proceeds to an emergency situation detection step (step S24).

In the case where the prediction value is less than a predetermined value, on the other hand, it indicates that no emergency situation will be encountered a predetermined time later. In this case (negative in step S18), it is determined whether the prediction notification flag is set or not (step S21).

In the case where the prediction notification flag is set (affirmative in step S21), an avoidance notice is given to the emergency report service station 100 (step S22), and the prediction notice flag is cleared (step S23), followed by proceeding to the emergency situation detection step (step S24). In the case where the prediction notice flag is not set (negative in step S21), on the other hand, the process proceeds directly to the emergency situation detection step (step S24).

In the emergency situation detection step (step S24), the process for detecting an emergency situation is carried out, and it is determined from the detection result whether an emergency situation prevails or not (step S25).

In the case where an emergency situation is not prevailing (negative in step S25), it is determined whether the on-vehicle power supply is turned off as the result of an engine stop (step S26). In the case where the on-vehicle power supply is not off (negative in step S26), the process is looped back to step S15.

In the case where the on-vehicle power supply is turned off by an engine stop (affirmative in step S26), it is determined whether the prediction notice flag is set or not (step S27). In the case where the prediction notice flag is set (affirmative in step S27), an avoidance notice is sent to the emergency report service station 100 (step S28) and the prediction notice flag is cleared (step S29).

The process stands by until completion of the self-diagnosis conducted when the engine stops (step S30), and the result of self-diagnosis is acquired (step S31). The result of the self-diagnosis, together with the latest position information of the vehicle involved, is transmitted to the emergency report service station 100 (step S32).

In the case where an emergency situation is encountered (affirmative in step S25), on the other hand, the emergency situation detection result, together with the latest vehicle position information, is sent to the emergency report service station 100 (step S33), after which the process stands by until a reply reaches from the emergency report service station 100 confirming the arrival of the emergency situation detection result (step S34), and the communication line with the emergency report service station 100 is secured (connection maintained) (step S35). In the case where the reply confirming the arrival of the emergency situation detection result cannot be received from the emergency report service station 100, the transmission of the emergency situation detection result is tried a plurality of times, after which the fact can be notified to the driver.

Once a service corps or an ambulance crew arrive and the on-vehicle power supply is turned off (affirmative in step S36), the communication line is disconnected (connection canceled) (step S37).

Figure 5:
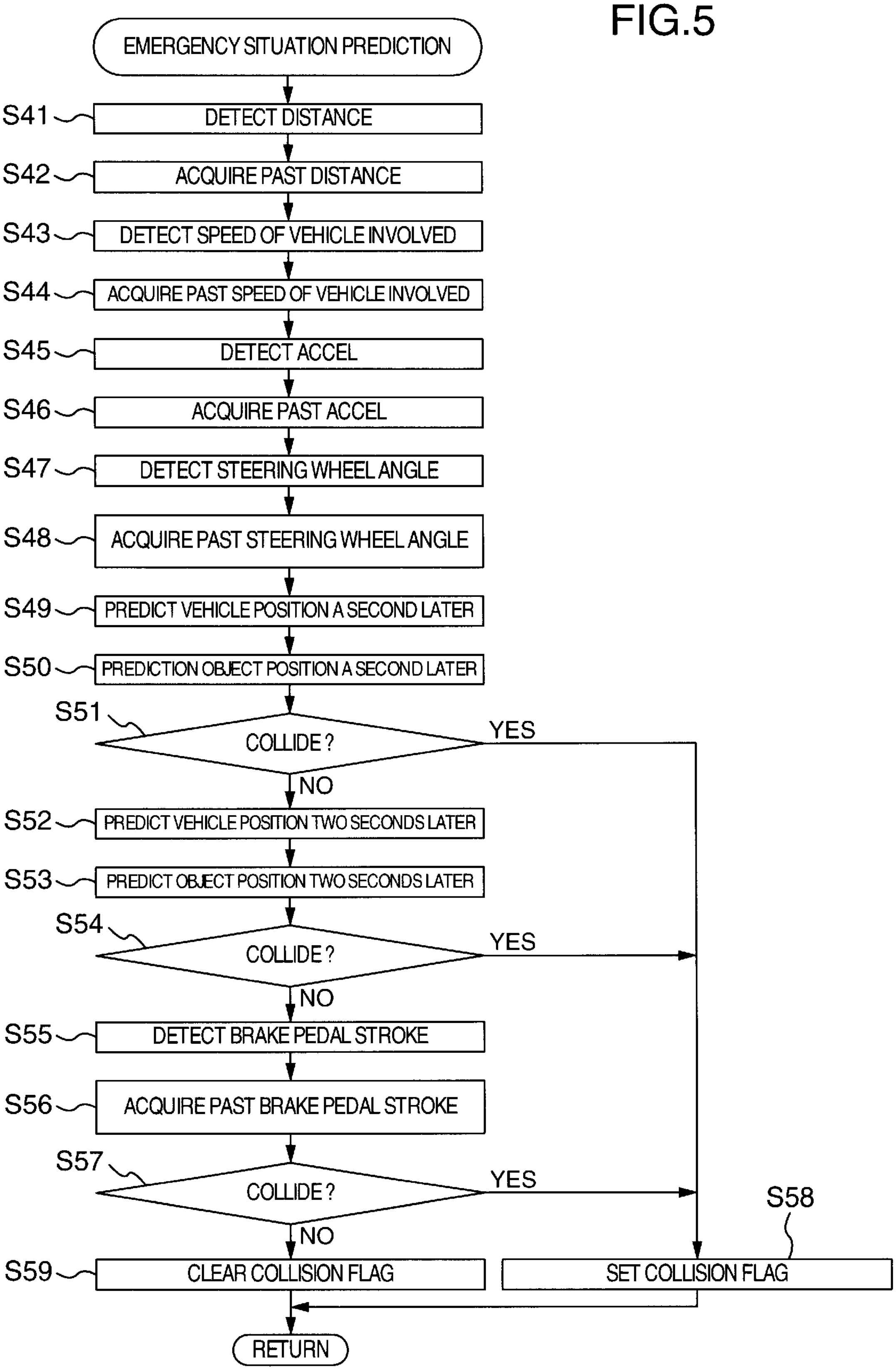
FIG. 5 is a flowchart showing the emergency situation prediction routine for an on-vehicle emergency report apparatus according to the invention.

Now, an example of the emergency situation prediction routine will be explained with reference to the flowchart of FIG. 5.

First, the distance between the vehicle involved and an object located ahead with which it may collide and the distance between the vehicle involved and an object located beside the vehicle involved with which it may collide are detected (step S41), the past distances are acquired (step S42), the speed of the vehicle involved is detected (step S43), the past speed of the vehicle involved is acquired (step S44), the acceleration is detected (step S45), the past acceleration is acquired (step S46), the steering wheel angle is detected (step S47) and the past steering wheel angle is acquired (step S48), in that order.

Upon complete process of information detection and acquisition described above, the position where the vehicle involved is to be located a second later is calculated, based on these information, with the current position of the vehicle involved as a reference point (step S49). The position where the object with which the vehicle involved may collide is to be located a second later is calculated with the current position of the vehicle involved as a reference point (step S50). Then, it is determined whether a collision occurs or not, by comparing the position where the vehicle involved is to be located a second later with the position where the object is to be located a second later (step S51).

In the case where it is determined by prediction that a collision will occur a second later (affirmative in step S51), the collision flag is set (step S58).

In the case where it is determined by prediction that no collision will occur (negative in step S51), on the other hand, the position where the vehicle involved is expected to be located two seconds later is calculated with the current position thereof as a reference point (step S52). In similar fashion, the position where the object is expected to be located two seconds later is calculated with the current position of the vehicle involved as a reference point (step S53). The position where the vehicle involved is expected to be located two seconds later and the position where the object is expected to be located two seconds later are compared with each other, and it is determined whether a collision will occur or not (step S54).

In the case where a collision two seconds later is predicted (affirmative in step S54), the collision flag is set (step S58).

In the case where no collision is predicted, on the other hand, the brake pedal stroke is detected (step S55) and the past brake pedal stroke is acquired (step S56), so that it is determined whether a collision occurs or not based on the brake pedal stroke and the distance between the vehicle involved and the object located ahead with which the vehicle involved may collide (step S57). In the case where a collision is predicted (affirmative in step S54), the collision flag is set (step S58). In the case where no collision is predicted, on the other hand, the collision flag is cleared (step S59).

Setting the collision flag is identical with the fact that the prediction value for an emergency situation is not less than a predetermined value, while clearing the collision flag is identical with the fact that the prediction value for an emergency situation is less than the predetermined value.

The prediction of an emergency situation becomes more accurate by the processing flow described above.

Figure 6:
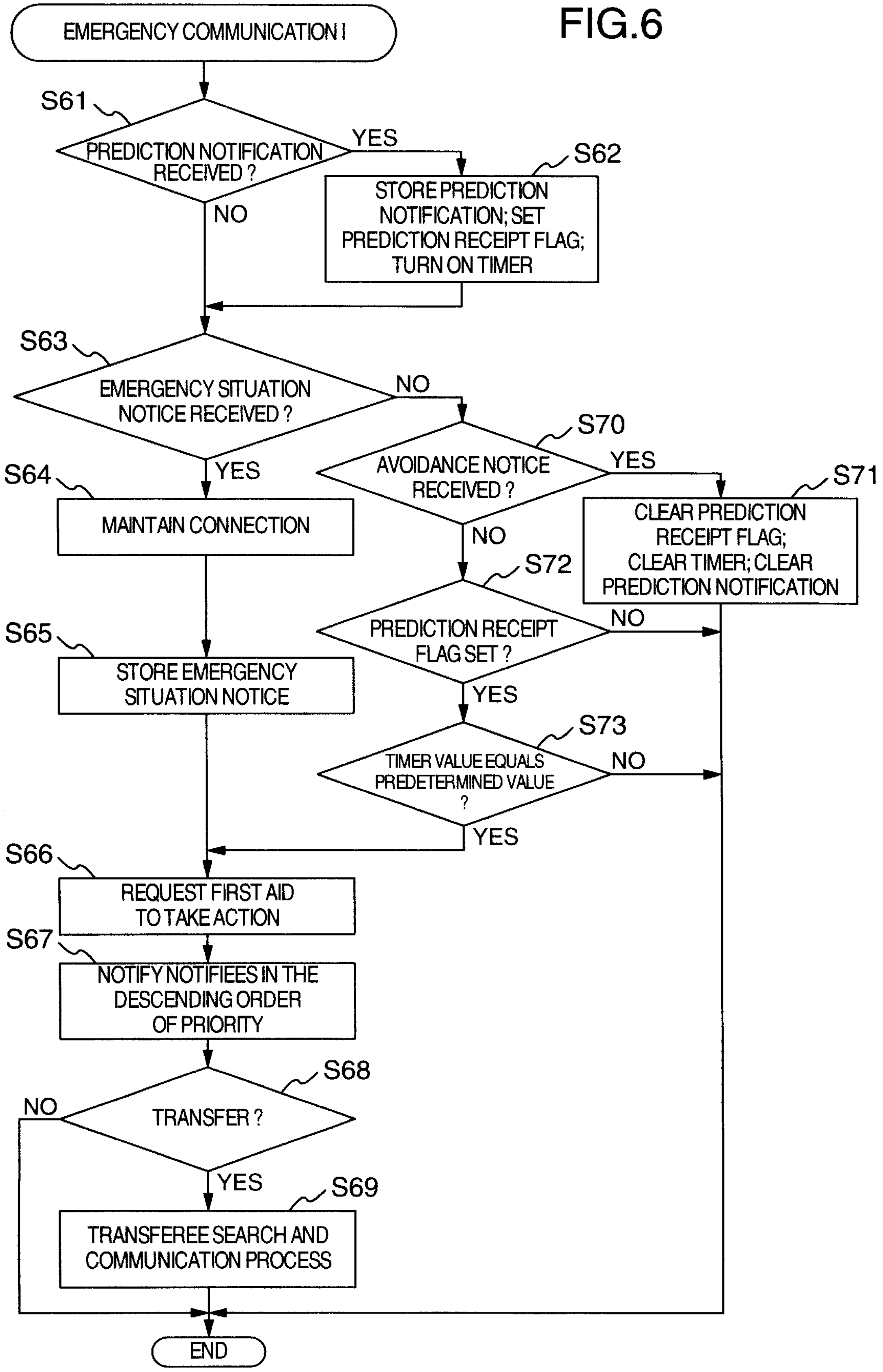
FIG. 6 is a flowchart showing the processing flow for an emergency communication apparatus according to the invention.

The emergency communication process performed by the emergency communication apparatus 101 installed in the emergency report service station 100 will be explained with reference to the flowchart of FIG. 6.

The emergency communication apparatus 101 is always ready to receive a report from the on-vehicle emergency report apparatus 11, and upon receipt of a report predicting an emergency situation from the on-vehicle emergency report apparatus 11 (step S61), stores the contents of the report as first information, sets the prediction receipt flag, and turns on a timer (step S62).

It is then determined whether an emergency situation report has been received or not from the on-vehicle emergency report apparatus 11 (step S63). Upon receipt of an emergency situation report (affirmative in step S63), the communication line with the on-vehicle emergency report apparatus 11 that has transmitted the report is secured (connection maintained) (step S65), and the contents of the emergency situation report are stored as the first information (step S65). A first aid is requested to develop a service corps or an ambulance (step S66). Through a communication line different from the communication line connected with the on-vehicle emergency report apparatus, 11, the first information is sent to the fire department 213, the road management office 211, the police station 212, the home of the occupant 215, the home of his/her relative 216 and the office 217, in that order (step S67). The first information sent to these various places is also sent to the on-vehicle emergency report apparatus 11.

In the case where the report to the home of the occupant 215, the home of the relative 216 or the office 217 is transferred to another place (affirmative in step S68), the communication process for searching for the transferee is performed (step S69).

In the case where the emergency situation report is not received (negative in step S63), on the other hand, it is determined whether the report has been received or not from the on-vehicle emergency report apparatus 11 (step S70). In the case where an avoidance notice is received (affirmative in step S70), the contents of the prediction notice (first information) from the on-vehicle emergency report apparatus 11, the prediction receipt flat and the timer are all cleared (step S71).

In the case where the avoidance report is not received (negative in step S70), on the other hand, it is determined whether the prediction receipt flag is set or not (step S72). In the case where the prediction receipt flag is set (affirmative in step S72), the timer value is checked (step S73).

In the case where the timer value is not less than a predetermined value (affirmative in step S73), it indicates that neither the avoidance notice nor the emergency situation report is sent even upon lapse of a predetermined time from the time when an emergency situation prediction report is sent from the on-vehicle emergency report apparatus 11. Under this condition, it is highly possible that an emergency situation has disabled the on-vehicle emergency report apparatus 11 to communicate, and it is finally determined that an emergency situation has occurred.

Also in this case, a first aid is requested to send a service corps or an ambulance (step S66). The first information is sent to the fire department 213, the road management office 211, the police station 212, the home of the occupant 215, the home of his/her relative 216 and the office 217, in that order, through a communication line different from the communication line connected with the on-vehicle emergency report apparatus 11 (step S67).

Figure 7:
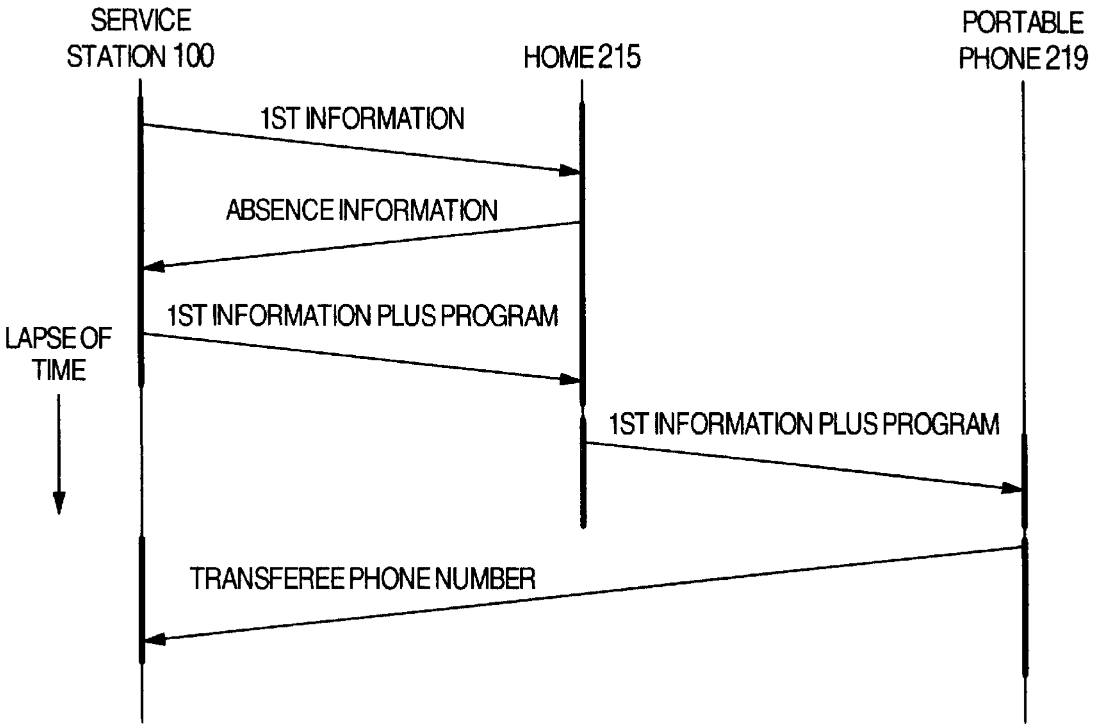
FIG. 7 is a time chart showing the process for searching for the transferee by an emergency communication apparatus according to the invention.

Now, a specific example of the communication process (step S69) to search for a transferee will be explained with reference to the time chart of FIG. 7. As an example, consider a case in which the transfer is set from the home (telephone) 215 to a portable telephone 219.

In the case where the first information is transmitted from the emergency report service station 100 (the emergency communication apparatus 101) to the home 215 which is set in transfer mode, the absence information is returned to the emergency report service station 100. In response, the emergency report service station 100 terminates the communication by transmitting to the home 215 a computer program for automatically transmitting to the emergency report service station 100 the first information to be transmitted to the transferee and the telephone number of the transferee.

The home 215 transmits the first information and the program to the portable telephone 219, i.e. the transferee. The portable telephone 219, upon complete transfer communication with the home 215, starts the received program and executes the program so that the transferee telephone number (telephone number of the particular portable telephone) is sent to the emergency report service station 100.

As a result, the second report (the transmission of the third information described later, etc.) which otherwise might be transmitted to the home 215 from the emergency report service station 100 can be transmitted directly to the transferee.

Also, the emergency communication apparatus 101 receives the position information of the emergency-reporting vehicle at predetermined time intervals, and can transmit the latest position information of the emergency-reporting vehicle to the notifiee person concerned.

Figure 8:
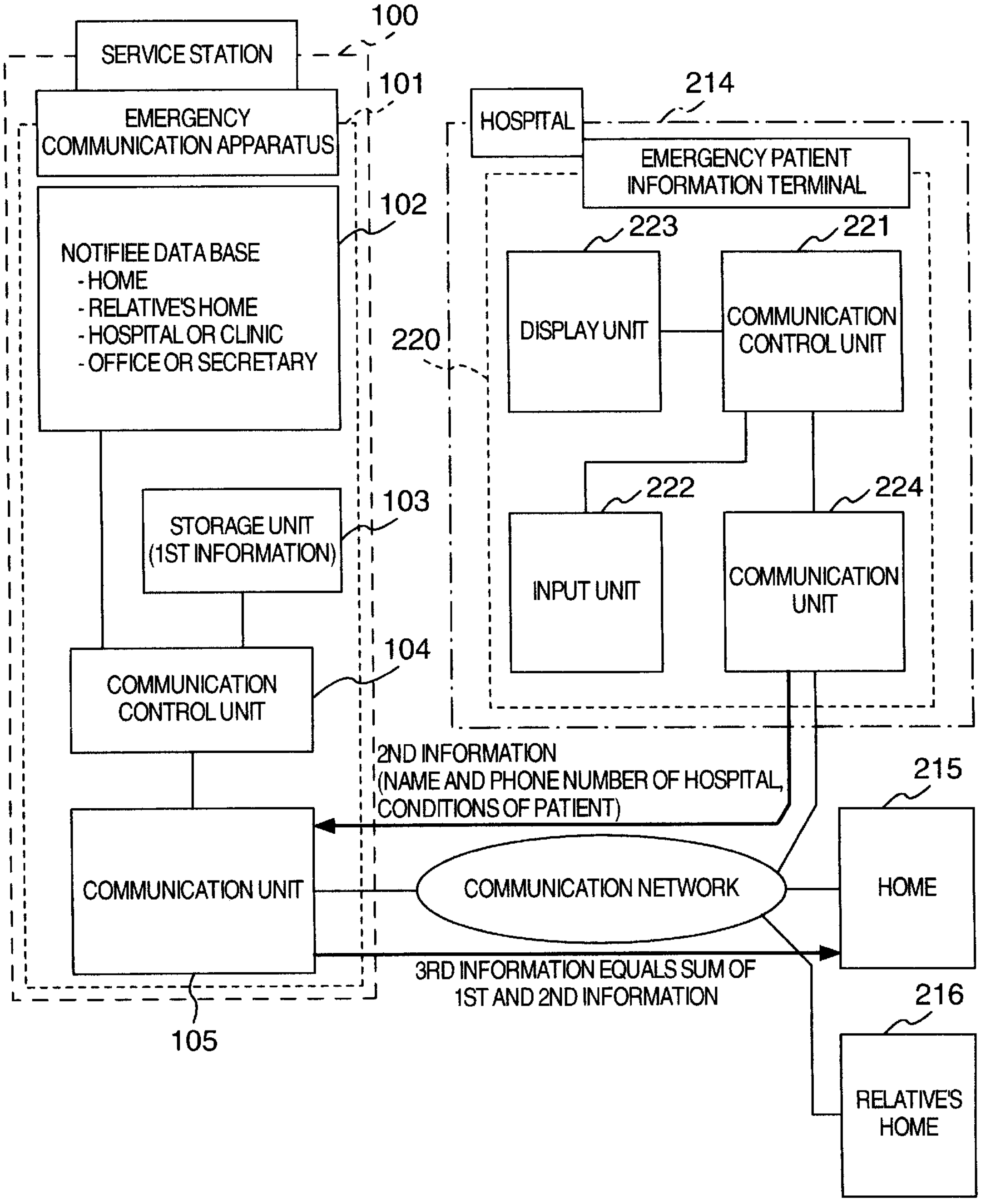
FIG. 8 is a diagram for explaining an emergency communication apparatus and an emergency patient information terminal (hospital terminal) according to the invention.

Now, with reference to FIG. 8, an explanation will given of a configuration of the emergency communication apparatus 101 installed at the service station 100 and a hospital terminal (an emergency patient information terminal 220) at a destination hospital 214 to which the service-receiving driver may be transported.

The emergency communication apparatus 101 is configured of a computer with the communication function, comprising a notifiee data base 102, storage unit 103 for storing the first information, communication control unit 104 and communication unit 105. The notifiee data base 102 has stored therein the private information of each service-receiving driver including the telephone numbers of the home 215, the home of his/her relative 216 and the office (secretary) 217, in addition to the telephone numbers of the road management office 211, the police station 212, the fire department 213 and the hospital (clinic) 214.

The emergency patient information terminal 220 is configured of a computer with the communication function, comprising communication control unit 221, input unit 222 such as a keyboard, display unit 223 such as a CRT and communication unit 224.

Figure 9:
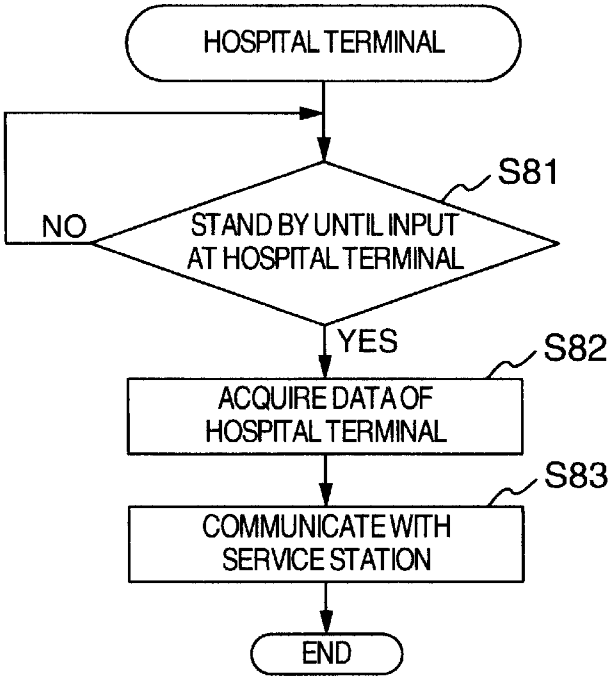
FIG. 9 is a flowchart showing the flow of the process performed at the hospital terminal.
Figure 10:
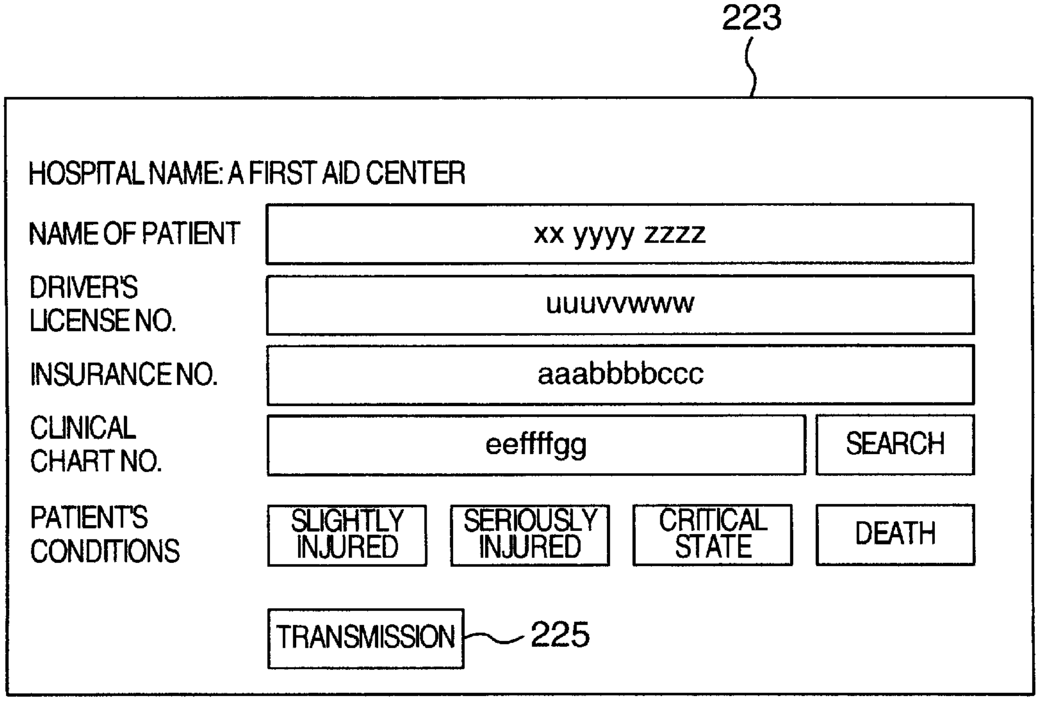
FIG. 10 is a diagram for explaining the input screen of the hospital terminal.

Now, the process at the emergency patient information terminal 220 will be explained with reference to the flowchart of FIG. 9. The emergency patient information terminal (hospital terminal) 220 is ready to receive an input with an input screen displayed as shown in FIG. 10 (step S81). As soon as an emergency patient arrives, various data are acquired by inputting the name, the driving license No. (insurance policy No.), the clinical chart No. and the conditions (slightly injured, seriously injured, critical state, dead) of the particular patient on the input screen of FIG. 10 (step S82).

Upon depression of a transmission button 225 on the input screen, the second information including the hospital information such as the name and the telephone number of the hospital and the conditions of the patient are transmitted to the emergency report service station 100 (step S83).

The emergency communication apparatus 101 of the emergency report service station 100, upon receipt of the second information from the destination hospital 214, generates the third information based on the first and second information, and transmits the third information to the notifiee registered for the patient (the service-receiving driver).

Figure 11:
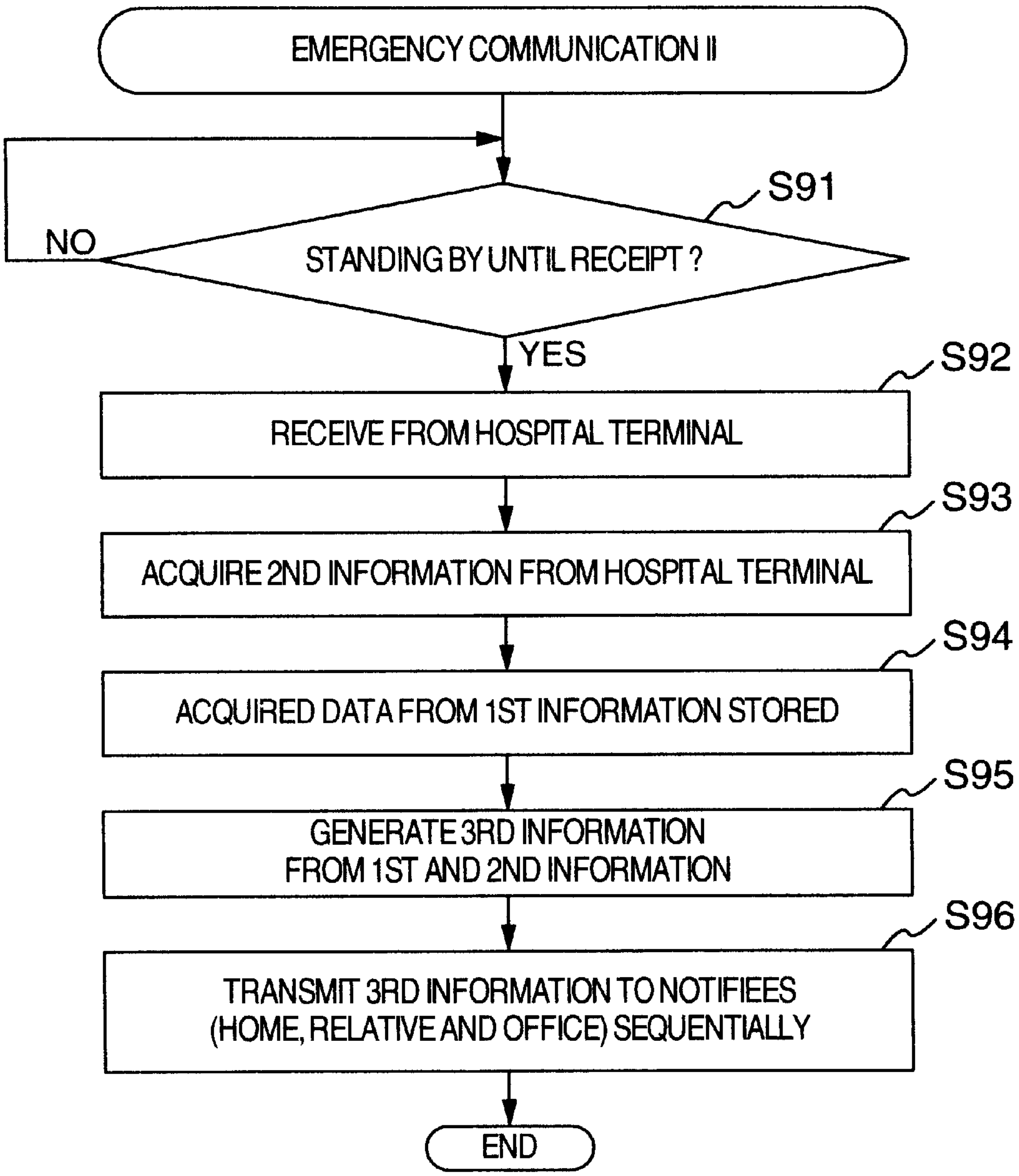
FIG. 11 is a flowchart showing the processing flow for an emergency communication apparatus according to the invention.

This communication process will be explained with reference to the flowchart of FIG. 11. The emergency communication apparatus 101 is ready to receive a report (step S91), and by receipt of the report from the hospital terminal 220 (step S92), acquires the second information from the hospital terminal 220 (step S93).

Then, the first information in store is acquired (step S94), and the third information is generated from the first and second information (step S95). The third information thus generated is transmitted to the home 215, the relative's home 216 and the office 217 in that order.

As a result, the emergency destination of the occupant (the service-receiving driver) and the safety condition of the patient are rapidly and accurately reported to the persons concerned for an improved serviceability.

FIG. 12 shows a configuration of the emergency situation detection unit 13. The emergency situation detection unit 13 is configured of an acceleration switch A 301, an acceleration switch B 302, an acceleration sensor 303 and a CPU 304. The acceleration switch A 301 is turned on when a predetermined acceleration is measured, and kept off otherwise. The acceleration switch B 302 is similar to the acceleration switch A 301. The acceleration sensor 303 produces an output voltage changing in proportion to the acceleration.

FIG. 13 shows the control processing flow of the emergency situation detection unit 13. First, self-diagnosis is carried out with the on-vehicle power supply turned on (step S120). After that, it is determined whether the acceleration switch A 301 is on or off (step S121). In the case where the acceleration switch A 301 is on, the emergency situation flag A is set (step S123), while in the case where it is off, the emergency situation flag A is cleared (step S122). Then, it is determined whether the acceleration switch B is on or off (step S124). In the case where it is on, the emergency situation flag B is set (step 126), while in the case where the acceleration switch B is off, the emergency situation flag A is cleared (step S125).

As the next step, the output frequency of the acceleration sensor 303 is analyzed (step S127), and it is determined whether a specified frequency component (40 Hz to 60 Hz) is higher than a predetermined level (50 $m/s^2$) (step S128). In the case where the answer is affirmative, the emergency situation flag C is set (step S130), while in the case where the specific frequency component is lower than the predetermined level, the emergency situation flag C is cleared (step S129).

In the case where both the emergency situation flags A and C are set (step S131) or both the emergency situation flags B and C are set (step S132), the emergency situation flag D is set (step S134). In the case where neither the emergency situation flag A nor the emergency situation flag C is set and neither the emergency situation flag B nor the emergency situation flag C is set, then the emergency situation flag D is cleared (step S133). Further, in the case where the on-vehicle power supply is turned on, the process returns to step S121, while in the case where the on-vehicle power supply is turned off, the process is terminated.

Figure 14:
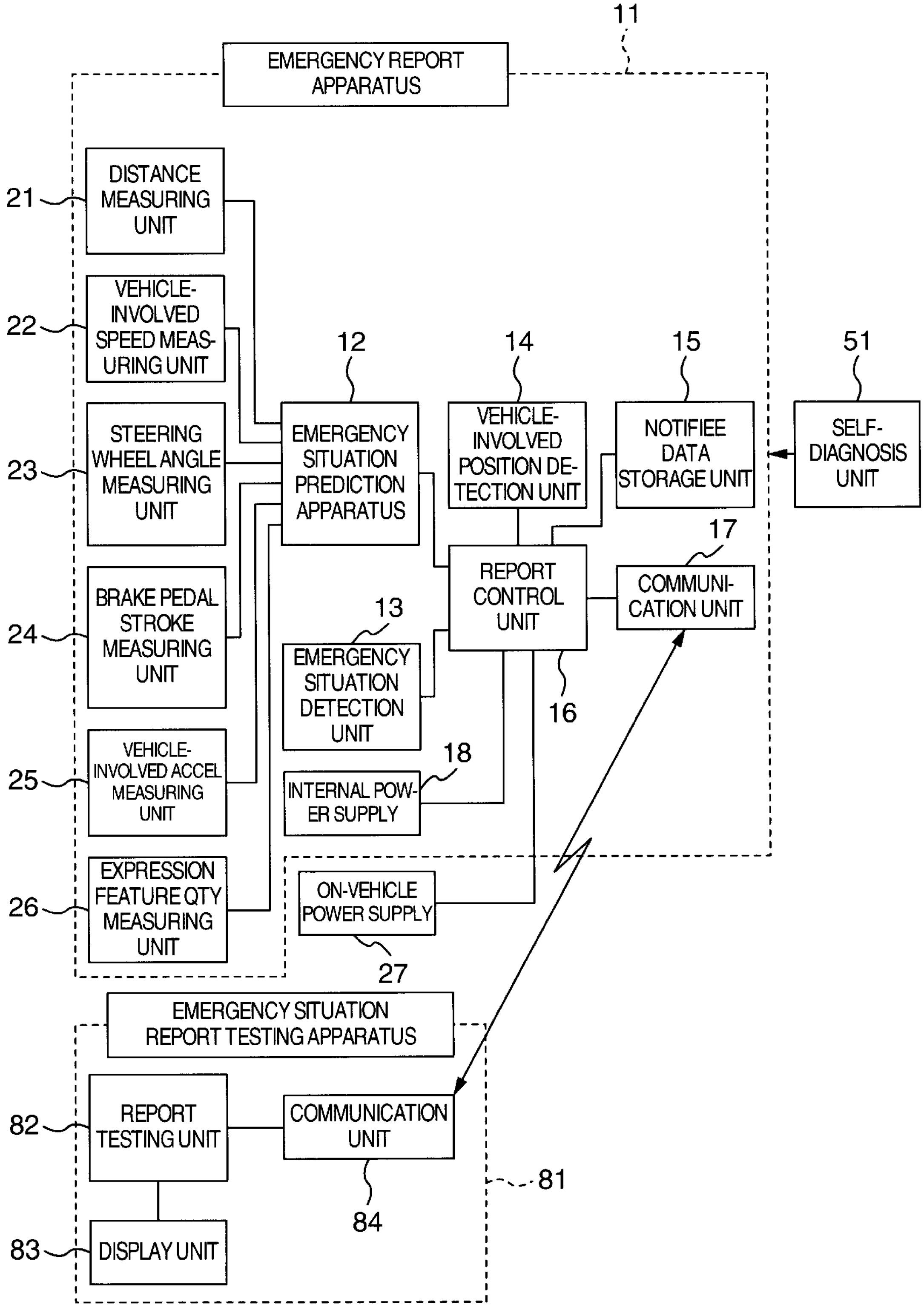
FIG. 14 is a diagram for explaining an on-vehicle emergency report apparatus and an emergency situation report testing apparatus according to the invention.

FIG. 14 shows an emergency report testing apparatus 81. The emergency report testing apparatus 81 includes report test unit 82, display unit 83, and communication unit 84 for communicating with the on-vehicle emergency report apparatus 11, wherein the result of self-diagnosis is received from the on-vehicle emergency report apparatus 11 and displayed on the screen of the display unit 83, the acknowledgment of the receipt is transmitted to the on-vehicle emergency report apparatus 11, and the presence or absence of the response thereto is displayed on the screen of the display unit 83.

Figure 15:
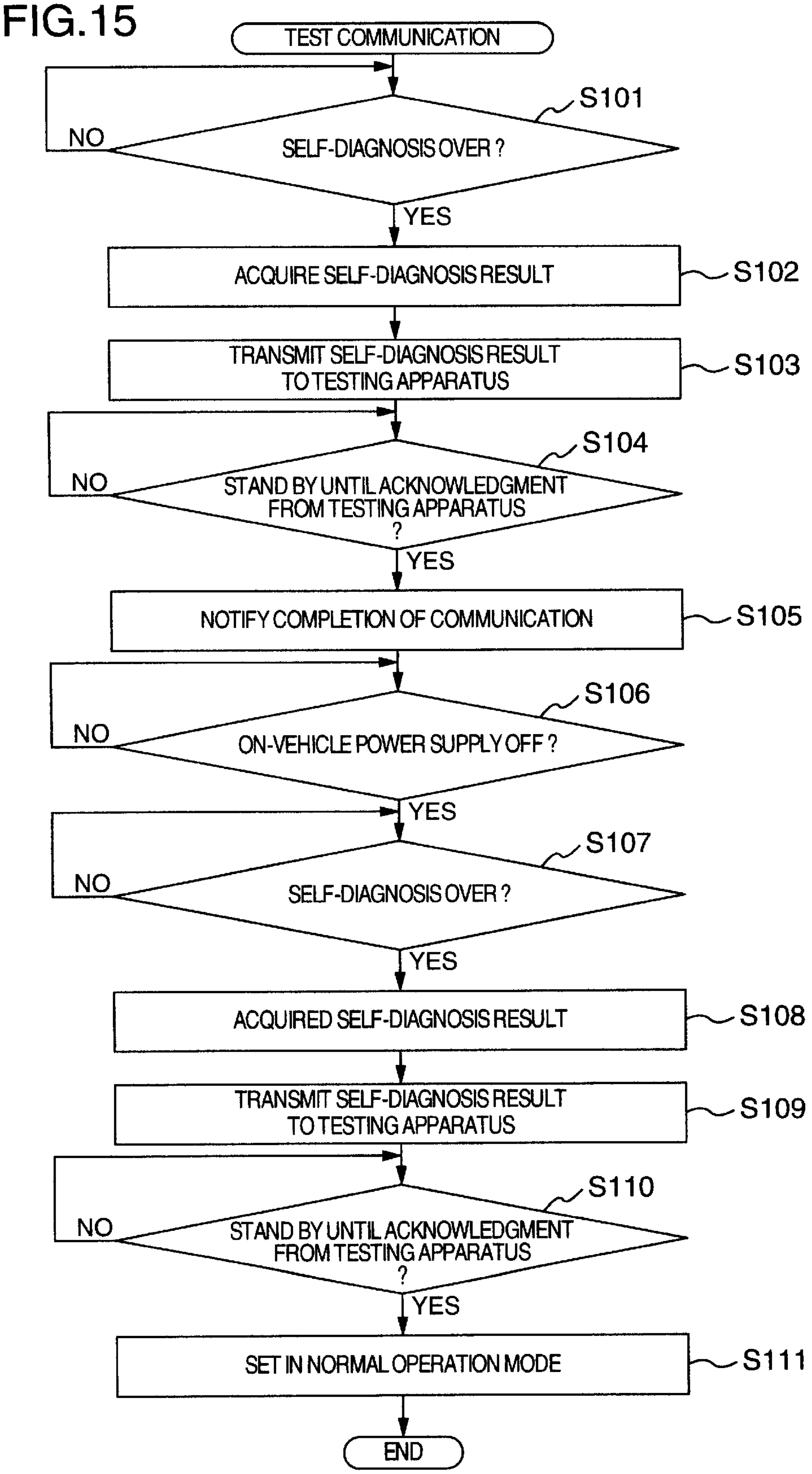
FIG. 15 is a flowchart showing the processing flow of the test communication performed by the on-vehicle emergency report apparatus according to the invention.

Now, the process performed by the emergency report apparatus 11 at the time of the test conducted by the emergency report testing apparatus 81 will be explained with reference to the flowchart of FIG. 15.

This flow of process is started by turning on a power supply. The process stands by until the end of the self-diagnosis of the vehicle conducted at the time of starting the engine (step S101), and the self-diagnosis result is acquired (step S102). Then, the self-diagnosis result is transmitted to the testing apparatus 81 (step S103).

After that, the process stands by until the receipt of the acknowledgment of the receipt of (reply to) the self-diagnosis result from the testing apparatus 81 (step S104), and upon receipt of the acknowledgment from the testing apparatus 81, the completion of the series of communication is notified to the testing apparatus 81 (step S105).

Then, the process stands by until the switching off of the on-vehicle power supply (step S106). When the on-vehicle power supply is switched off, the process stands by until the end of the self-diagnosis conducted when the engine stops (step S107). Then, the self-diagnosis result is acquired (step S108). The self-diagnosis result is transmitted to the testing apparatus 81 (step S109).

Subsequently, the process stands by until the acknowledgment, by the testing apparatus 81, of the receipt of (reply to) the self-diagnosis result (step S110), and upon receipt of the acknowledgment from the testing apparatus 81, the test mode is terminated, and the setting is changed to perform the normal operation from when the power supply is next switched on (step S111).

An embodiment of the invention is described in detail above. Nevertheless, the invention is not limited to this embodiment, but is variously modifiable in design stage without departing from the scope of claims and the spirit of the invention.

What is claimed is:

1. An on-vehicle emergency report apparatus comprising vehicle position detection means for detecting the position of a vehicle, emergency situation prediction means for predicting that the vehicle encounters an emergency situation, and communication means for communicating with an emergency report service station, wherein:

the emergency situation prediction means predicts whether the vehicle would encounter an emergency situation after a predetermined period of time, based on at least one of the distance from the vehicle to an object with which the vehicle may collide, the relative speed, the relative acceleration, the speed, and the brake pedal stroke, the steering wheel angle and the facial expression of the driver of the vehicle;

said emergency situation prediction means predicts the position of the vehicle and the position of said object with which said vehicle may collide, as of the predetermined period time later, based on the distance between said vehicle and said object, and the speed, the acceleration and the steering wheel angle of the vehicle, and estimates a possibility of collision based on the predicted positions of said vehicle and said object; and an estimated result is transmitted to said emergency report service station by said communication means, together with vehicle position information detected by the vehicle position detection means.

2. An emergency communication apparatus comprising:

a data base for storing contact information related to emergency contacts;

means for receiving an emergency report from an on-vehicle emergency report apparatus;

means for requesting a first aid service to take an emergency action;

means for receiving information related to a prospective destination of an occupant of an emergency-reporting vehicle from the first aid service;

means for searching said data base for contact information related to an emergency contact associated with the occupant; and means for transmitting the information related to the destination of the occupant to the emergency contact based on the contact information associated with the occupant;

wherein if a telephone of the emergency contact has set a transfer mode, an alternative telephone number is received from one of said telephone of the emergency contact and the alternative telephone, and the information related to the destination of the occupant is transmitted to the alternative telephone.

3. An emergency report system comprising:

an on-vehicle emergency report apparatus including:

vehicle position detection means for detecting the position of a vehicle;

emergency situation prediction means for predicting whether the vehicle would encounter an emergency situation after a predetermined period of time, based on at least one of the distance from the vehicle to an object with which the vehicle may collide, the relative speed, the relative acceleration, the speed, and the brake pedal stroke, the steering wheel angle and the facial expression of the driver of the vehicle; and communication means for communicating with an emergency report service station; and an emergency communication apparatus including:

communication means; and a data base for storing contact information related to emergency contacts;

wherein said communication means includes:

means for receiving an emergency report from said on-vehicle emergency report apparatus;

means for requesting a first aid service to take an emergency action;

means for receiving information related to a prospective destination of an occupant of an emergency-reporting vehicle from the first aid service, means for searching said data base for contact information related to an emergency contact associated with the occupant; and means for transmitting the information related to the destination of the occupant to the emergency contact.

4. An emergency communication apparatus comprising:

a database for storing contact information related to emergency contacts associated with an individual; and communication means for receiving information related to the individual and a destination of said individual for emergency care from a first aid station, searching said database for emergency contacts associated with said individual based on said information related to said individual, and transmitting said information related to the destination of said individual to at least one of said emergency contacts associated with said individual.

5. An emergency communication apparatus according to claim 4, wherein said first aid station is an emergency hospital or an emergency transportation service.

6. An emergency communication apparatus according to claim 4, wherein said information about emergency contacts associated with said individual includes a contact address of said individual's home or relatives.

7. An emergency communication apparatus according to claim 4, wherein said communication means transmits information about conditions of said individual in addition to said information related to the individual and a destination of said individual to said emergency contacts associated with said individual.

8. An emergency communication apparatus according to claim 4, wherein said information related to said individual includes at least one of a name of said individual, a driver's license number, and an insurance policy number for identifying said individual.

9. An emergency communication apparatus according to claim 4, wherein said information about a destination of said individual includes at least one of a name, phone number and street address of said first aid station.

10. An emergency communication apparatus comprising:

a database for storing information related to emergency contacts associated with an individual; and communication means for receiving an emergency report specifying said individual from an on-vehicle emergency report apparatus, searching said database for said information about emergency contacts associated with said individual based on said emergency report, and transmitting information about a destination of said individual to said emergency contacts associated with said individual;

wherein when said communication means receives information about a destination of said individual for emergency care and specifying said individual from a first aid station, said communication means searches said database for said information related to the emergency contacts associated with said individual based on said information about a destination of said individual, and transmits said information about a destination of said individual and said emergency report to at least one of the emergency contacts associated with said individual.

* * * * *